United States Patent
Rune et al.

(10) Patent No.: US 6,611,685 B1
(45) Date of Patent: Aug. 26, 2003

(54) HOME LOCATION REGISTER FAULT RECOVERY

(75) Inventors: Johan Rune, Lindingö (SE); Yun Chao Hu, Yokohama (JP); Juan Noguera-Rodriguez, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/453,906

(22) Filed: Apr. 12, 2000

Related U.S. Application Data

(60) Provisional application No. 60/128,786, filed on Apr. 12, 1999.

(51) Int. Cl.⁷ .................................................. H04Q 7/20

(52) U.S. Cl. ..................................... 455/433; 455/432.1

(58) Field of Search ............................... 455/33.1, 33.2, 455/54.1, 54.2, 56.1, 433, 461, 435, 432, 432.1; 379/62, 58, 59, 63; 370/352, 56, 8, 24; 714/41, 14

(56) References Cited

U.S. PATENT DOCUMENTS

| | | | |
|---|---|---|---|
| 5,467,381 A | * 11/1995 | Peltonen et al. | ............... 379/58 |
| 5,497,412 A | * 3/1996 | Lannen et al. | ................ 379/60 |
| 5,610,974 A | 3/1997 | Lantto | |
| 6,002,931 A | * 12/1999 | Yamaguchi et al. | ........ 455/433 |
| 6,137,791 A | * 10/2000 | Frid et al. | .................... 370/352 |
| 6,259,782 B1 | * 7/2001 | Gallant | ........................ 379/211 |

FOREIGN PATENT DOCUMENTS

| | | |
|---|---|---|
| DE | 196 40 288 A1 | 4/1998 |
| WO | 94/21090 WO | 9/1994 |

OTHER PUBLICATIONS

S. Chen et al.: "Fault Tolerance of PCS Mobility Databases"; Proceedings of the International Conference On Computer Communications and Networks, Sep. 22, 1997, IEEE, XP002061518 pp. 542–547.

"Procedure for Restoration of HLR", European Telecommunication Standard, vol. GSM 9.02, No. Version 3.8.0, 1991, p. 275, ETSI, XP000652720.

Yasuyuki Uchiyama et al.: "Network Functions and Signals for Personal Roaming Between Digital Cellular Standards"; NTT Mobile Communcations Network Inc., Apr. 1995, 1995 Fourth IEEE International Conference On Universal Personal Communications Record Meiji Kinenkan, Tokyo, Japan Nov. 6–10, 1995, pp. 447–451.

PCT International Search Report dated May 10, 2001.
PCT International Search Report dated Jul. 27, 2000.
TS GSM 09.02, "Digital Cellular Telecommunications System (Phase 2+) Mobile Application Part (MAP) Specification", from ETSI, Mar. 12, 1999, pp. 472–475.

* cited by examiner

*Primary Examiner*—William Trost
*Assistant Examiner*—N Mehrpour

(57) ABSTRACT

A method and apparatus for home location register fault recovery in a system which uses a gateway location register to reduce signaling between visitor location registers and home location registers. When a home location register is recovering from a fault, the home location register sends a reset message to the gateway location registers which are serving mobile subscribers associated with the home location register. The gateway location register sends a reset message to visitor location registers which are serving mobile subscribers associated with the home location register. The gateway location register can determine which mobile subscribers are associated with the home location register by comparing mobile subscriber identification information stored in the gateway location register with information contained in the reset message from the home location register.

25 Claims, 12 Drawing Sheets

HOME LOCATION REGISTER FAULT RECOVERY

CROSS-REFERENCE TO RELATED APPLICATIONS

Referenced-applications

This application claims priority under 35 U.S.C. §§119 and/or 365 to U.S. Provisional Application No. 60/128,786 filed on Apr. 12, 1999, the entire content of which is hereby incorporated by reference. This application is also related to the following applications filed on Apr. 12, 2000: U.S. patent application Ser. No. 09/453,907 "Gateway Location Register Fault Recovery"; U.S. patent application Ser. No. 09/453,908 "Support For Features Associated With A Subscriber In Networks With A Gateway Location Register And A Visitor Location Register"; and U.S. patent application Ser. No. 09/547,991 "Gateway Location Registers In A UMTS Systerm", all of which are herein expressly incorporated by reference.

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

Not Applicable

2. Field of the Invention

The present invention relates to mobile communications systems, and more specifically, to recovery of a home location register from a fault in a system where a gateway location register serves a visitor location register.

FIG. 1 illustrates a wireless communication system in accordance with the Global System for Mobile communication (GSM) standard. The GSM standard is designed to provide a uniform interface which allows mobile communication subscribers of various countries to operate their mobile devices regardless of the current location of the mobile subscriber. A mobile subscriber typically has a subscription with a network which is designated as the mobile subscriber's home public land mobile network 110 (HPLMN). The HPLMN 110 has a home location register (HLR) 115 which contains, among other things, various information regarding the services provided to the mobile subscriber. When a mobile subscriber roams into a different network, which is referred to as a visited public land mobile network 120 (VPLMN), the VPLMN requires certain data regarding the mobile subscriber's subscription. The data regarding the mobile subscriber's subscription is also known as the mobile subscriber's profile. The mobile subscriber's profile is transferred from the HLR to a visitor location register (VLR) in the VPLMN 120.

In a GSM system mobile subscriber data is stored within the VLR that is associated with the mobile services switching center (MSC) that currently serves the mobile subscriber in order to reduce internetwork signaling between VLRs and HLRs. The decentralization of the VLRs within a GSM system (i.e., each MSC being equipped with a VLR) reduces intranetwork signaling as well. So, for example, if the mobile subscriber is roaming in an area of the VPLMN 120 which is controlled by the MSCNVLR 130, the HLR 115 will transfer the mobile subscriber's profile to MSC/VLR 130. Similarly, if the mobile subscriber is roaming in an area controlled by MSC/VLR 135, the HLR 115 will transfer the mobile subscribers profile to MSCNVLR 135.

Although FIG. 1 illustrates the MSCNVLR as a single network node, one skilled in the art will recognize that the MSC and VLR can be implemented as separate network elements.

To increase the compatibility of GSM with other types of systems, it is anticipated that future versions of the GSM standard, also called Universal Mobile Telecommunications System (UMTS), will incorporate elements of other mobile communications systems. For example, the Japanese Personal Digital Cellular (PDC) system includes a network node which is used to reduce internetwork signaling known as a gateway location register (GLR). FIG. 2 illustrates an exemplary mobile communications system in accordance with the PDC system. Like a GSM system, a home network 210 includes an HLR 215 which contains the mobile subscriber's profile. When a mobile subscriber roams into a visited network 220 the mobile subscriber's profile is transferred to GLR 225. In GSM terms, the GLR can be described as a VLR for all mobile subscribers roaming from other networks. Hence, only one GLR is needed for each network.

FIG. 3 illustrates an exemplary UMTS system which incorporates the GLR of the PDC system. When a mobile subscriber of HPLMN 310 roams into VPLMN 320, the HLR 315 will transfer the mobile subscriber's profile to GLR 325. Then, depending upon which area within the VPLMN 320 the mobile subscriber is roaming, the GLR 325 will transfer the mobile subscriber's profile to the respective MSCNVLR 330, 335 or 340. The introduction of the GLR 325 into a GSM system reduces internetwork signaling because once the mobile subscriber roams into VPLMN 320, the HLR will only need to transfer the mobile subscriber's profile to GLR 325. GLR 325 will be responsible for transferring the mobile subscriber's profile to the proper MSC/VLR within VPLMN 320 as the mobile subscriber travels around the VPLMN 320.

The protocol used by GSM/UMTS systems for transferring data between VLRs and HLRs is the mobile application part (MAP). FIG. 4 illustrates a conventional method using the MAP protocols in a GSM system when an HLR is recovering from a fault. In step 405 the HLR loads the contents of its non-volatile backup memory into its dynamic memory. Next the HLR sends a MAP_RESET message to the VLRs to which the HLR's mobile subscribers are currently associated as indicated by the information in the backup memory in accordance with step 410. The MAP_RESET request message includes the HLR number, which is the E.164 number of the HLR, and, optionally, an HLR identity (Id) list. The HLR Id list is a list of the possible combinations of leading digits of the IMSIs that belongto the concerned HLR, including Country Code (CC), network code and the leading digits of the National Destination Code (NDC). In step 415, the VLR determines which of the mobile stations that are currently served by the VLR are associated with the HLR which sent the MAP_RESET message. In conventional GSM systems there are two different ways for the VLR to determine which mobile stations are associated with a particular HLR. If the HLR Id list parameter is present in the MAP_RESET message the affected mobile subscribers can be identified as those mobile stations whose leading digits of their IMSI matches the digits of either of the HLR identities in the HLR Id list parameter. If the HLR Id list parameter is not present in the MAP_RESET message the affected mobile subscribers are derived using the HLR number in the MAP_RESET message, i.e., the affected mobile subscribers are those for which the HLR number stored in the mobile subscriber record in the VLR matches the HLR number received in the MAP_RESET message.

In step 420 the VLR sets the "Location Information Confirmed In HLR" flag for all of the affected mobile stations to "Not Confirmed". Setting this flag will force the VLR to perform a MAP_UPDATE_LOCATION service to update the HLR at the next authenticated radio contact with each affected mobile station. In step 425 the VLR waits for an authenticated radio contact from the concerned mobile subscriber. In step 430 the VLR determines whether it has received an authenticated radio contact from the concerned mobile subscriber. If the VLR has not received an authenticated radio contact from the concerned mobile subscriber, in accordance with the "No" path out of decision step 430, the VLR continues to wait in accordance with step 425. If the VLR receives an authenticated radio contact from the concerned mobile subscriber the VLR sends a MAP_UPDATE_LOCATION message to the HLR indicating that the VLR is serving the concerned mobile subscriber in accordance with step 435. The location updates sent from the VLRs to the HLR will gradually restore and confirm the mobile subscriber data of the restarted HLR.

Since GLRs are optional elements within the UMTS system, MAP procedures must be completely independent of the presence or absence of GLRs in a network. Accordingly, by using an HLR interface towards the VLRs and a VLR interface towards the HLRs, the GLR should be completely transparent. However, because of the dual nature of the GLR in the network it may be difficult for the GLR to behave in a way which simultaneously will be perceived as VLR behavior by the HLRs, and as HLR behavior by the VLRs. One such case is the fault recovery behavior of the HLR.

In a conventional GSM UMTS system, if a GLR were added to a VPLMN containing a VLR, the HLR would send the MAP_RESET message to the GLR instead of the VLR. However, since the GSM MAP protocols do not account for a GLR in the network, and the PDC MAP protocols do not account for a VLR in the network, there are no procedures defining how an HLR should recover from a fault when some of its affected mobile subscribers are located in areas where a gateway location register serves a visitor location register.

Accordingly, it would be desirable to provide methods and apparatus for HLR fault recovery in a UMTS system including a gateway location register and a visitor location register. Further, it would be desirable for the HLR fault recovery to be performed without violating the GSM MAP protocol, i.e. using the specified message formats and not violating any specified message sequences.

BRIEF SUMMARY OF THE INVENTION

According to exemplary embodiments of the present invention, methods and apparatus are provided for home location register fault recovery. A gateway location register receives a reset message from the home location register. The reset message contains a home location register number for the home location register. The gateway location register sends another reset message to a visitor location register. The another reset message includes a gateway location register number for the gateway location register. Alternatively, the another reset message includes a home location register number for the home location register and the home location register identity list.

In accordance with this aspect of the present invention the reset message and the another reset message can be MAP_RESET messages. In addition, the gateway location register can determine a mobile subscriber associated with the home location register, and the gateway location register determines that the visitor location register serves the mobile subscriber. Further, the reset message and the another reset message can include a home location register identity list. In addition, the visitor location register can identify affected mobile subscribers using either the gateway location register number or the home location identity list.

In accordance with another aspect of the present invention a gateway location register receives a reset message from the home location register, wherein the reset message includes a home location register number. A mobile subscriber associated with the home location register is determined by comparing a country code and national destination code of a mobile subscriber identity stored in a record associated with the mobile subscriber with a country code and national destination code of the home location register number. Alternatively, a mobile subscriber associated with the home location register can be determined by comparing the home location register number received in the reset message with a home location register number stored in a mobile subscriber record in the gateway location register.

In accordance with this aspect of the present invention the gateway location register determines a visitor location register which is currently serving the mobile subscriber. Another reset message is sent to a visitor location register which has been determined to be currently serving the mobile subscriber. Further, the another reset message is received by the visitor location register and it is determined whether there is a home location register identity list in the another reset message.

BRIEF DESCRIPTION OF THE SEVERAL VIEWS OF THE DRAWINGS

The present invention will now be described with reference to the accompanying drawings in which.

DETAILED DESCRIPTION OF THE INVENTION

In the following description, for purposes of explanation and not limitation, specific details are set forth, such as particular sequences of inter and intra network signaling, types of messages, etc. in order to provide a thorough understanding of the present invention. However, it will be apparent to one skilled in the art that the present invention may be practiced in other embodiments that depart from these specific details. In other instances, detailed descriptions of well-known methods, devices, and network elements are omitted so as not to obscure the description of the present invention.

The exemplary radio communication systems discussed herein are described as operating in accordance with the UMTS system, however, one skilled in the art will recognize that the present invention can be implemented in other mobile communications systems where a gateway is used to reduce internetwork signaling.

Figure 1:
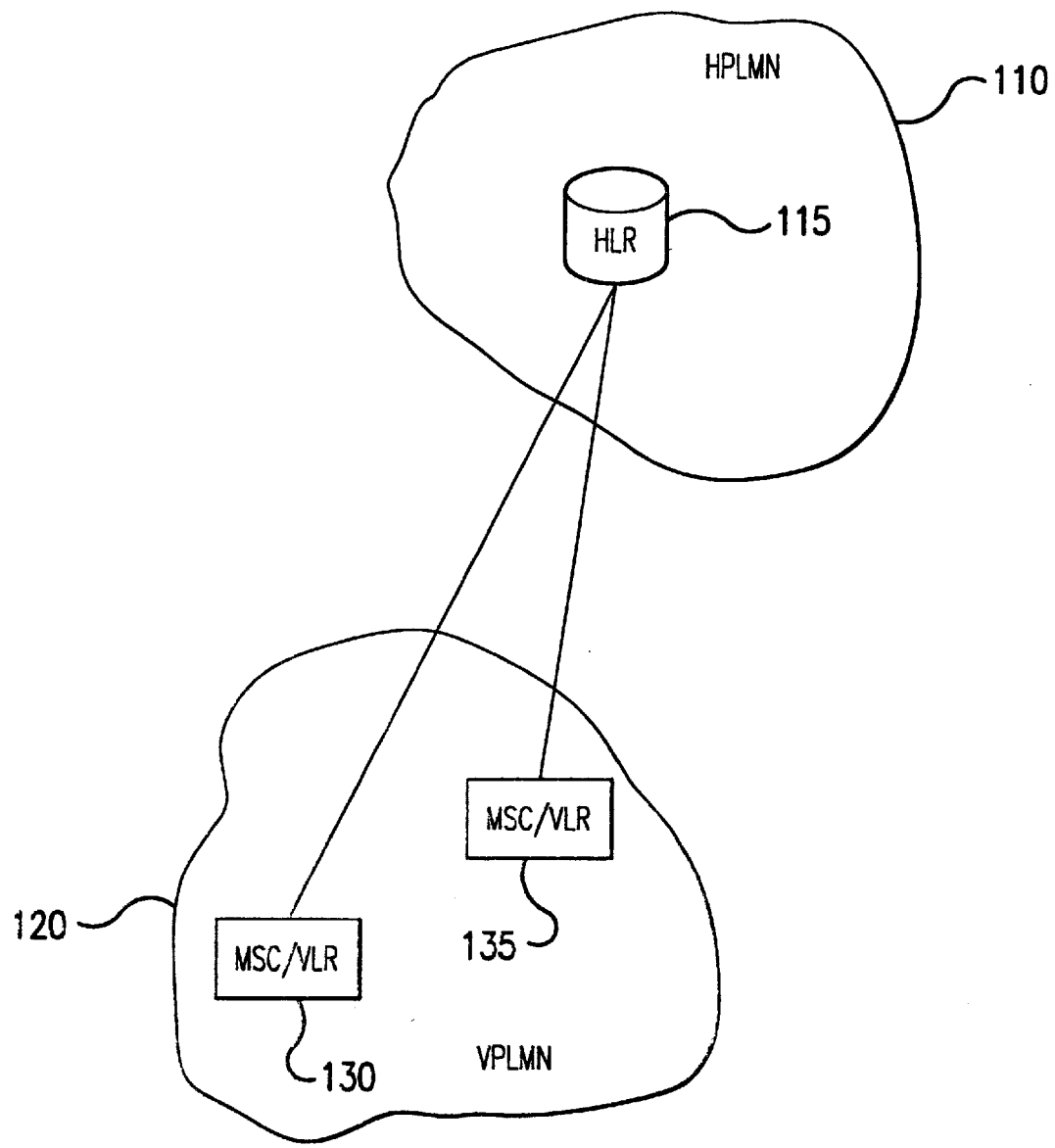
FIG. 1 illustrates a conventional GSM system.
Figure 2:
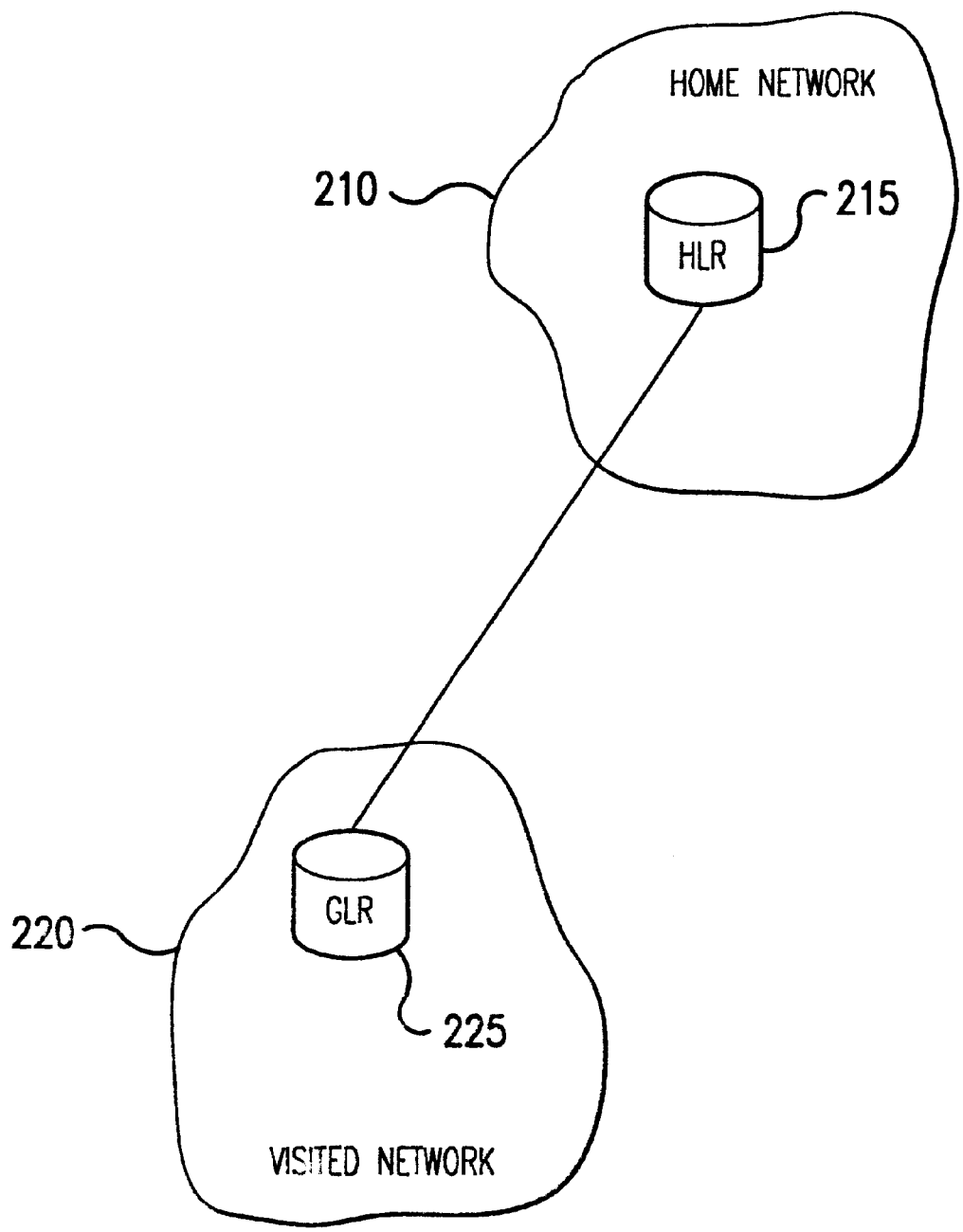
FIG. 2 illustrates a conventional PDC system.
Figure 3:
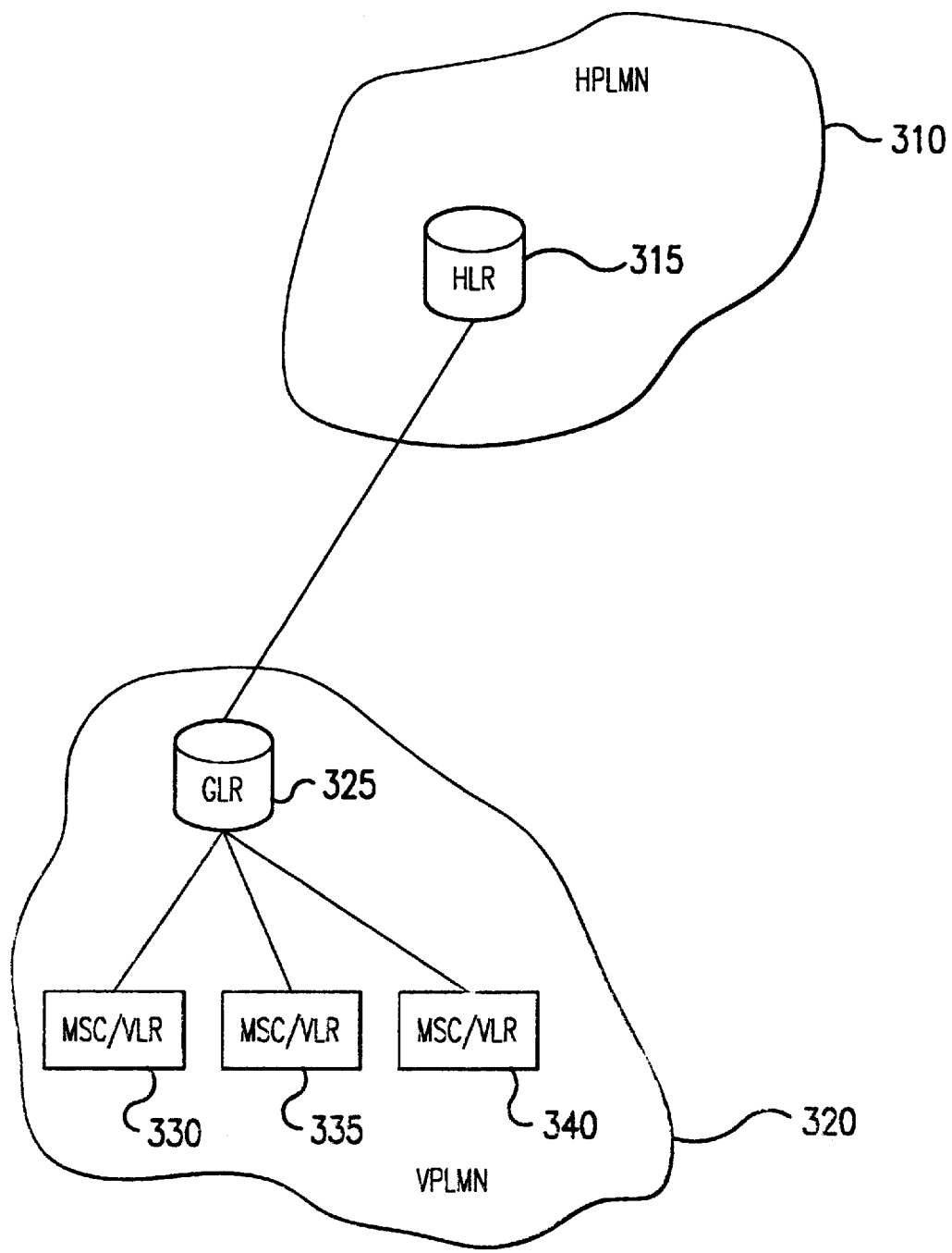
FIG. 3 illustrates the relationship of UMTS system elements in a system which includes a GLR.
Figure 4:
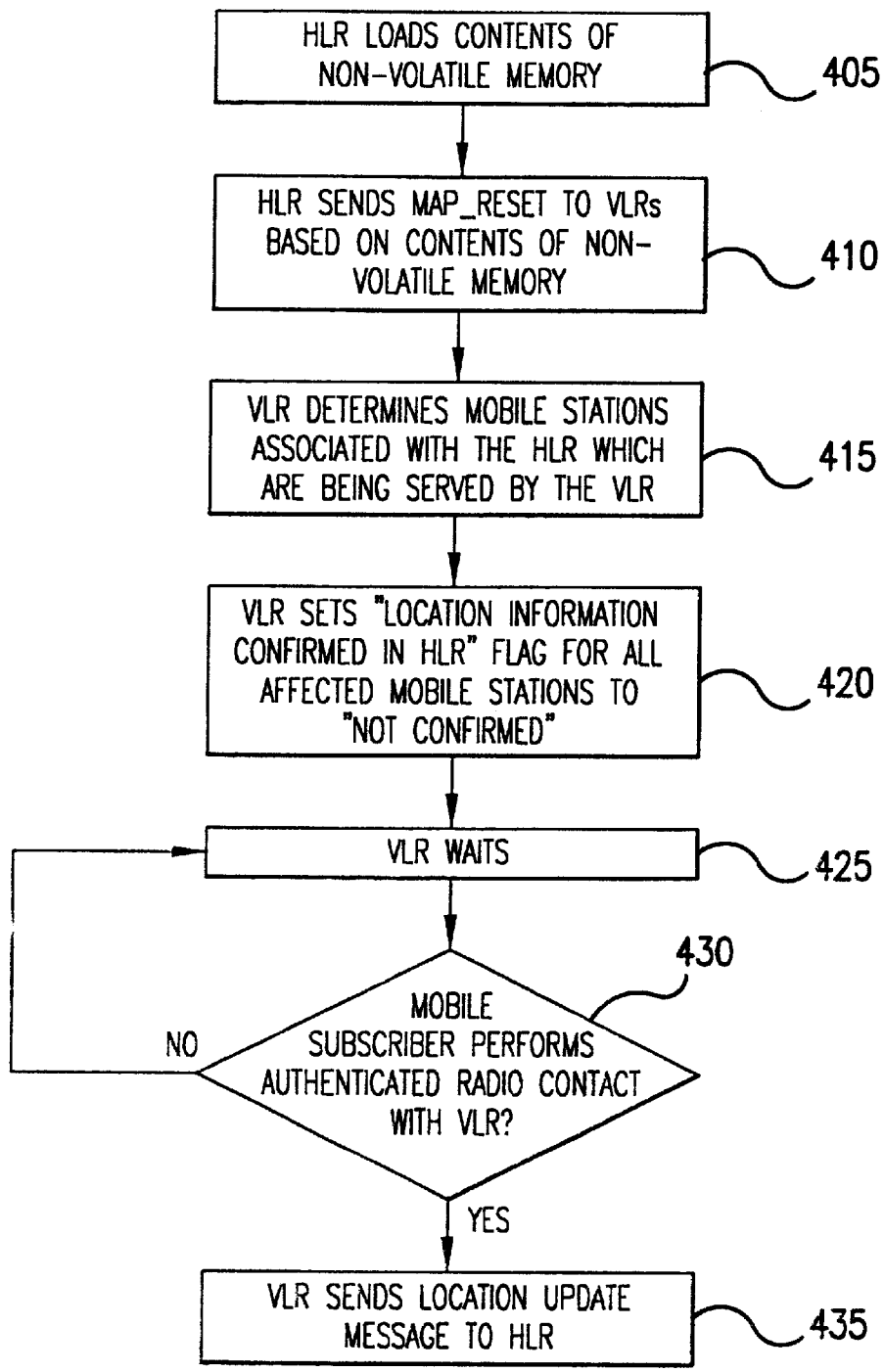
FIG. 4 illustrates a conventional method in a GSM system when an HLR is recovering from a fault.
Figure 5:
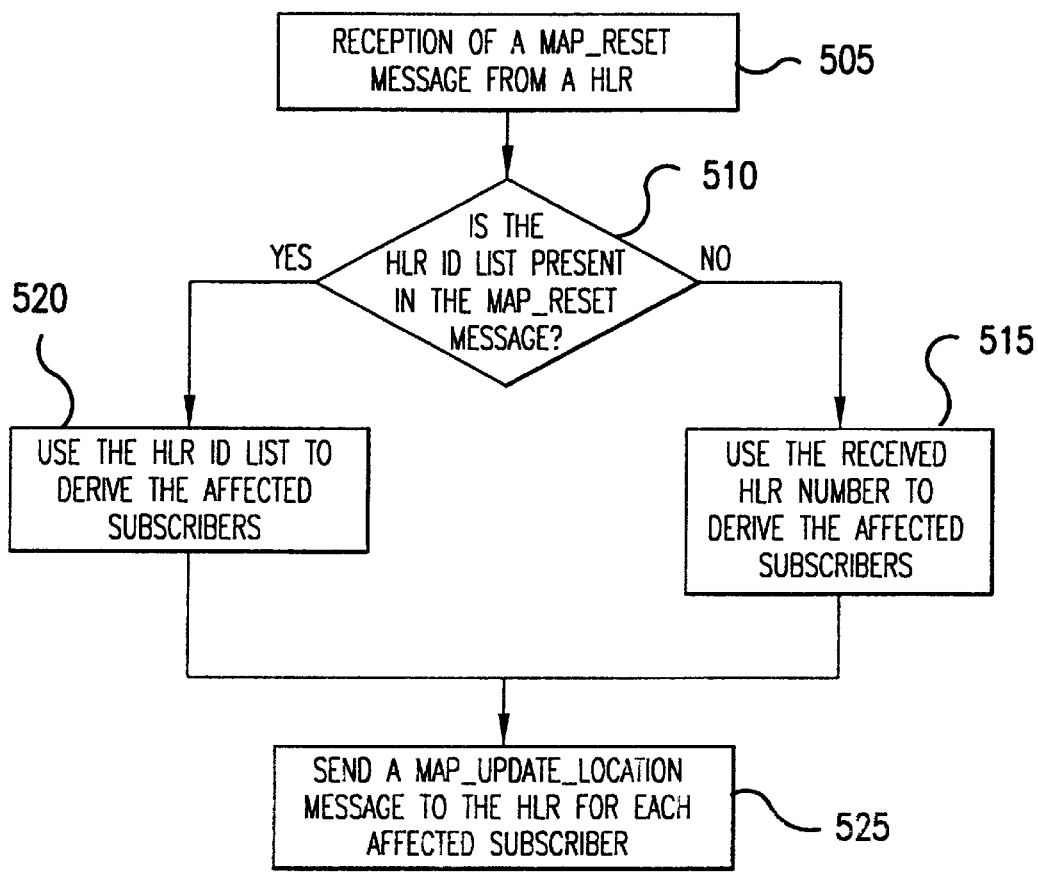
FIG. 5 illustrates an exemplary method for the behavior of a GLR in a UMTS system where an HLR is recovering from a fault in accordance with one embodiment of the present invention.

FIG. 5 illustrates an exemplary method for the behavior of a GLR in a UMTS system where an HLR is recovering from a fault in accordance with one embodiment of the present invention. In step 505 the GLR receives a MAP_RESET message from the HLR. In step 510 the GLR determines whether the HLR Id list is present in the MAP_RESET message. If the HLR Id list is not present in the MAP_RESET message, in accordance with the "No" path out of decision step 510, the GLR uses the received HLR number to determine which mobile subscribers are associated with the HLR which sent the MAP_RESET message in accordance with step 515. The GLR can determine which mobile subscribers are associated with the HLR by either comparing the received number with the number stored in the HLR Number record element in the mobile subscriber records stored in the GLR or by matching the Country Code and National Destination Code (CC+NDC) derived from the International Mobile Subscriber Identity (IMSI) with the CC+NDC of the received HLR number.

If the HLR Id list is present in the MAP_RESET message, in accordance with the "Yes" path put of decision step 510, the GLR uses the HLR Id list to determine which mobile subscribers are associated with the HLR which sent the MAP_RESET message in accordance with step 520. Once the GLR has determined the mobile subscribers associated with the HLR which sent the MAP_RESET message, in accordance with either step 515 or step 520, the GLR sends a MAP_UPDATE_LOCATION message to the HLR for each affected mobile subscriber, i.e., each mobile subscriber associated with the HLR recovering from a fault, in accordance with step 525.

Figure 6A:
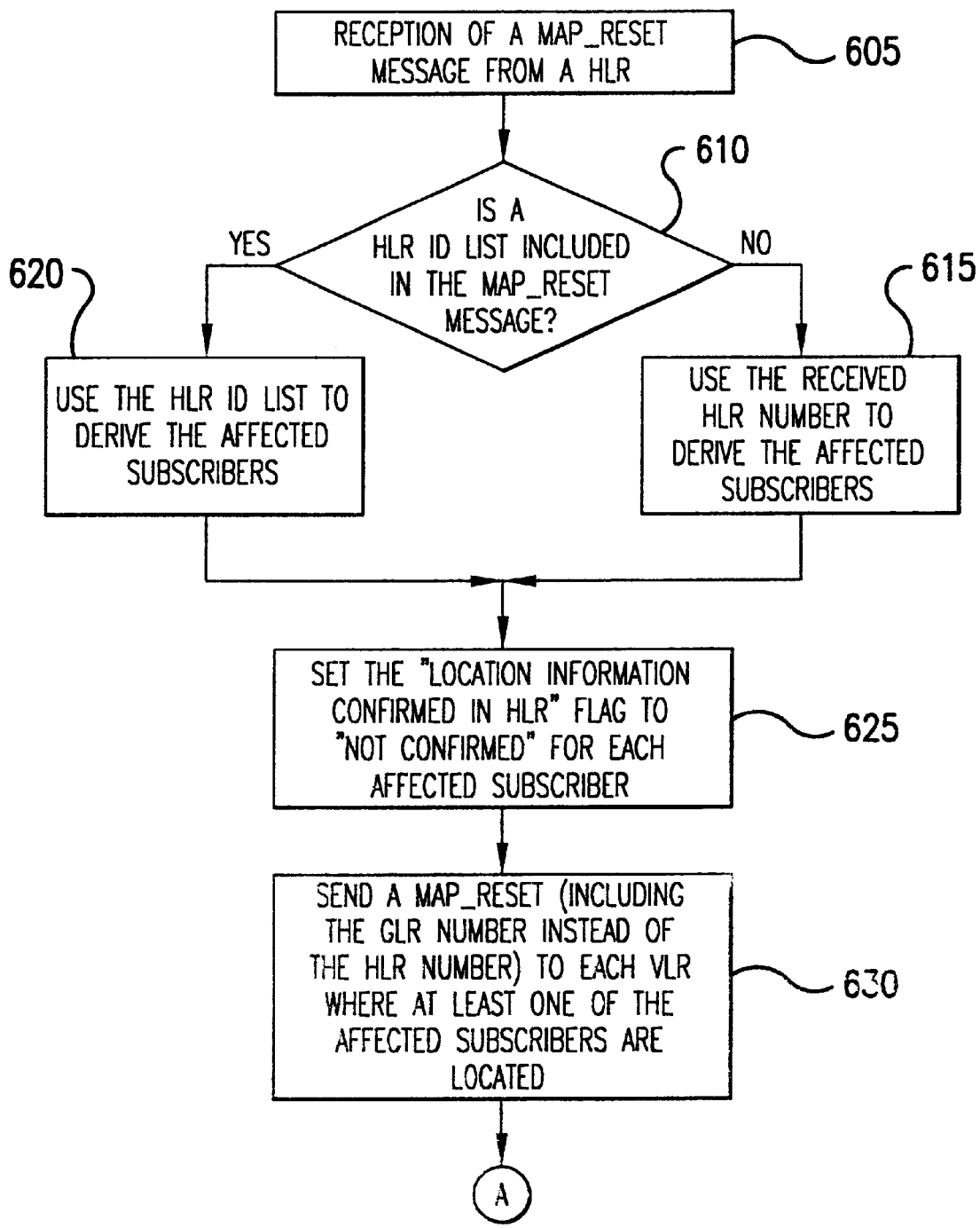
FIGS. 6A and 6B illustrate an exemplary method for the behavior of a GLR in a UMTS system where an HLR is recovering from a fault in accordance with another embodiment of the present invention.
Figure 6B:
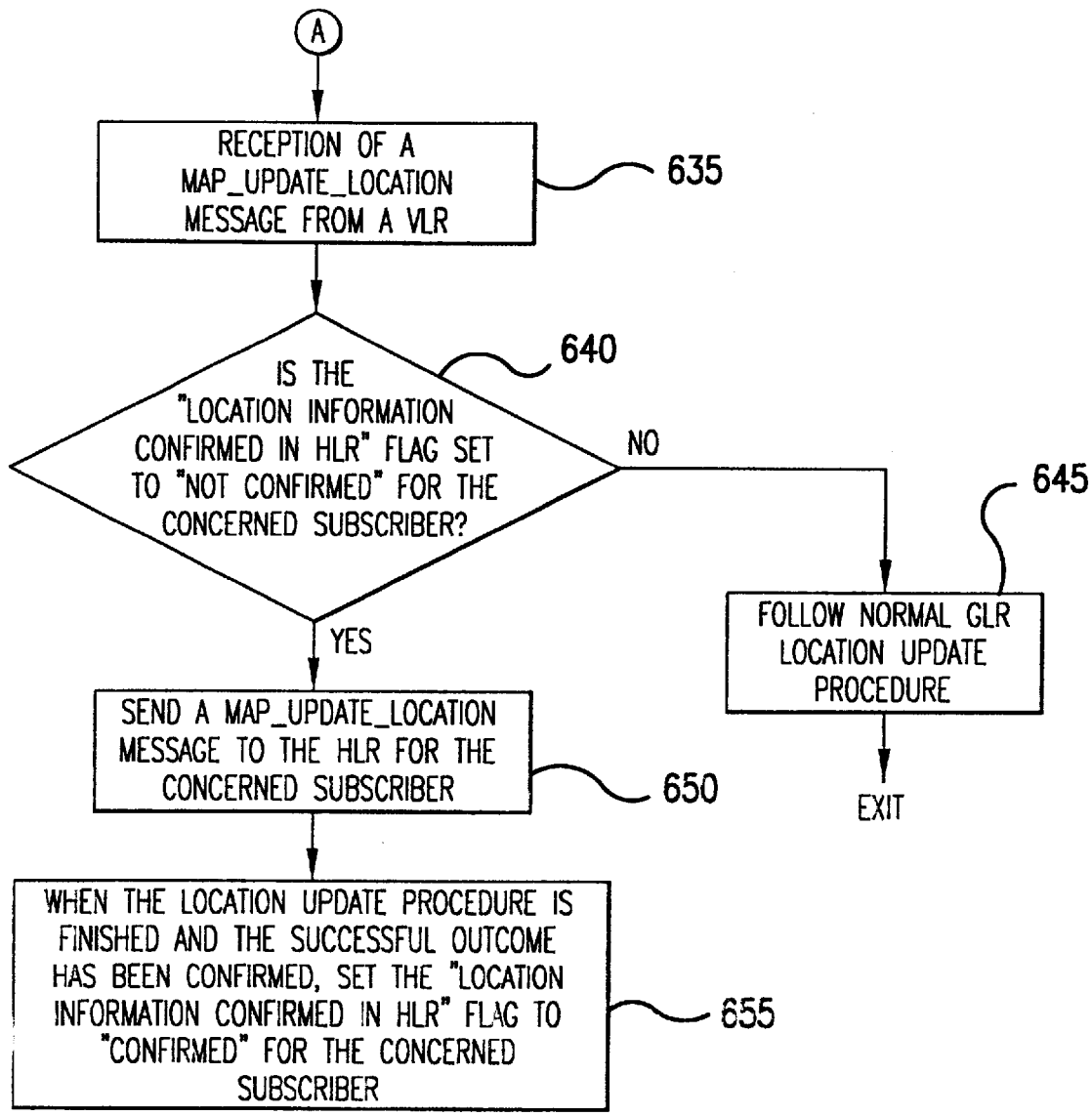

FIGS. 6A and 6B illustrate an exemplary method for the behavior of a GLR in a UMTS system where an HLR is recovering from a fault in accordance with another embodiment of the present invention. In step 605 the GLR receives a MAP_RESET message from an HLR. In step 610 the GLR determines whether the HLR Id list is present in the MAP_RESET message. If the HLR Id list is not present in the MAP_RESET message, in accordance with the "No" path out of decision step 610, the GLR uses the received HLR number to determine which mobile subscribers are associated with the HLR which sent the MAP_RESET message in accordance with step 615. The GLR can determine which mobile subscribers are associated with the HLR by either comparing the received number with the number stored in the HLR Number record element in the mobile subscriber records stored in the GLR or by matching the CC+NDC derived from the IMSI with the CC+NDC of the received HLR number.

If the HLR Id list is present in the MAP_RESET message, in accordance with the "Yes" path out of decision step 610, the GLR uses the HLR Id list to determine which mobile subscribers are associated with the HLR which sent the MAP_RESET message in accordance with step 620. Once the GLR has determined the mobile subscribers associated with the HLR which sent the MAP_RESET message, in accordance with either step 615 or step 620, the GLR sets the "Location Information Confirmed In HLR" flag to "Not Confirmed" for each mobile subscriber served by the GLR which is associated with the HLR in accordance with step 625. In step 630 the GLR sends a MAP_RESET message, including the GLR number instead of the HLR number, to each VLR where at least one of the mobile subscribers associated with the HLR is located.

The MAP_RESET message will cause the VLRs to begin the location updating procedure with the GLR upon the next authenticated radio contact with one of the affected mobile subscribers. Accordingly, in step 635 the GLR receives a MAP_UPDATE_LOCATION message from a VLR which has received the MAP_RESET message. In step 640 the GLR determines whether the "Location Information Confirmed In HLR" flag is set to "Not Confirmed" for the mobile subscriber identified in the MAP_UPDATE_LOCATION message. If "Location Information Confirm In HLR" flag is set to "Confirmed" for the mobile subscriber, i.e., the flag is not set to "Not Confirmed", in accordance with the "No" path out of decision step 640, the GLR follows the normal location update procedure in accordance with step 645, i.e., the GLR will respond with a MAP_UPDATE_LOCATION response message after sending subscription information from mobile subscriber records stored in the GLR using the MAP_INSERT_SUBSCRIBER_DATA procedure.

If the "Location Information Confirmed In HLR" flag is set to "Not Confirmed" for the mobile subscriber, in accordance with the "Yes" path out of decision step 640, the GLR sends a MAP_UPDATE_LOCATION message to the HLR for the mobile subscriber identified in the MAP_UPDATE_LOCATION message received from the VLR in accordance with step 650. When the location updating procedure between the GLR and HLR is completed and a successful outcome has been confirmed, the GLR sets the "Location Information Confirmed In HLR" flag to "Confirmed" for the mobile subscriber in accordance with step 655. Also, in this case the GLR will send mobile subscriber data and a MAP_UPDATE_LOCATION response message to the VLR.

Figure 7A:
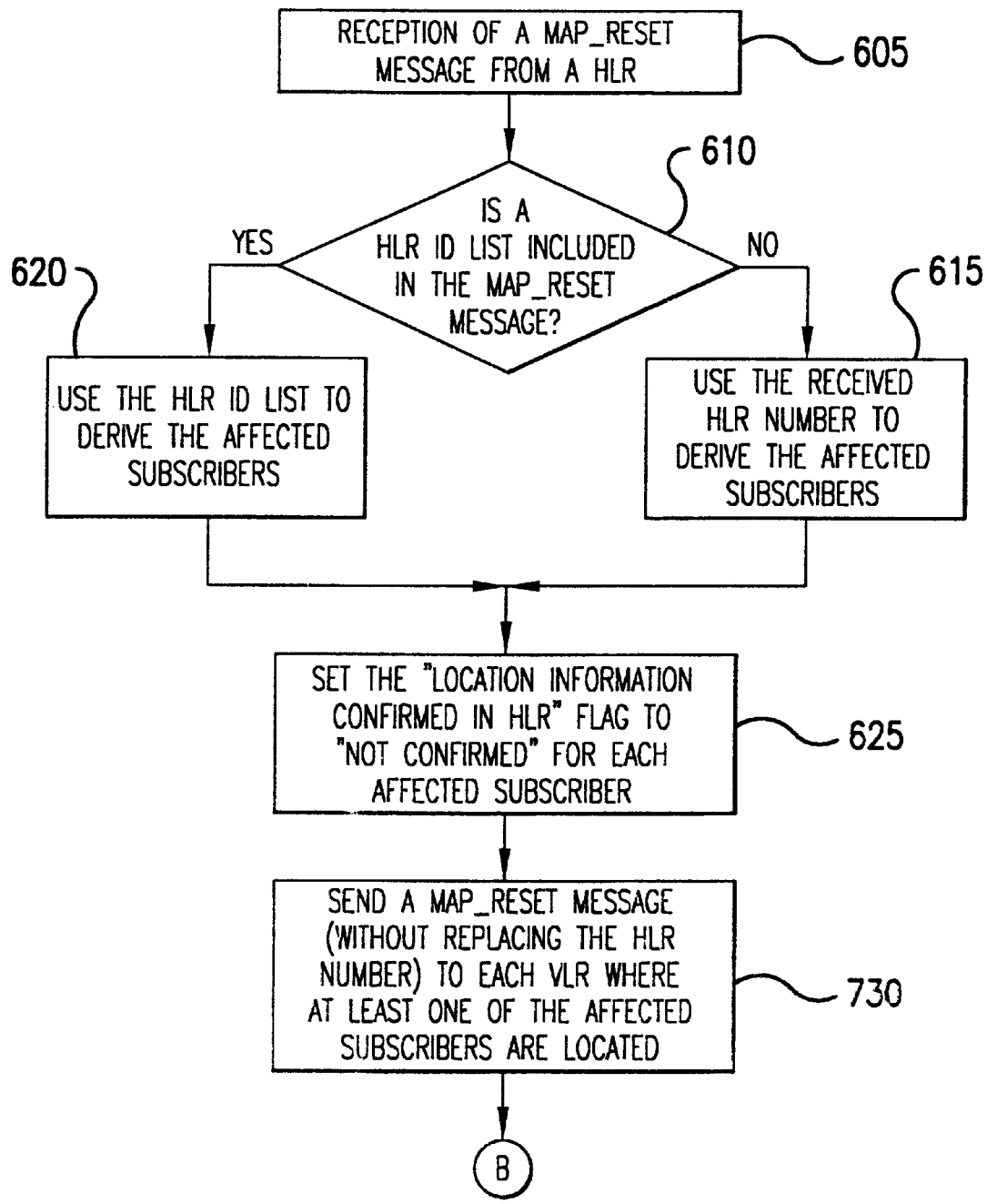
FIGS. 7A and 7B illustrate an exemplary method for the behavior of a GLR in a UMTS system where an HLR is recovering from a fault in accordance with yet another embodiment of the present invention.
Figure 7B:
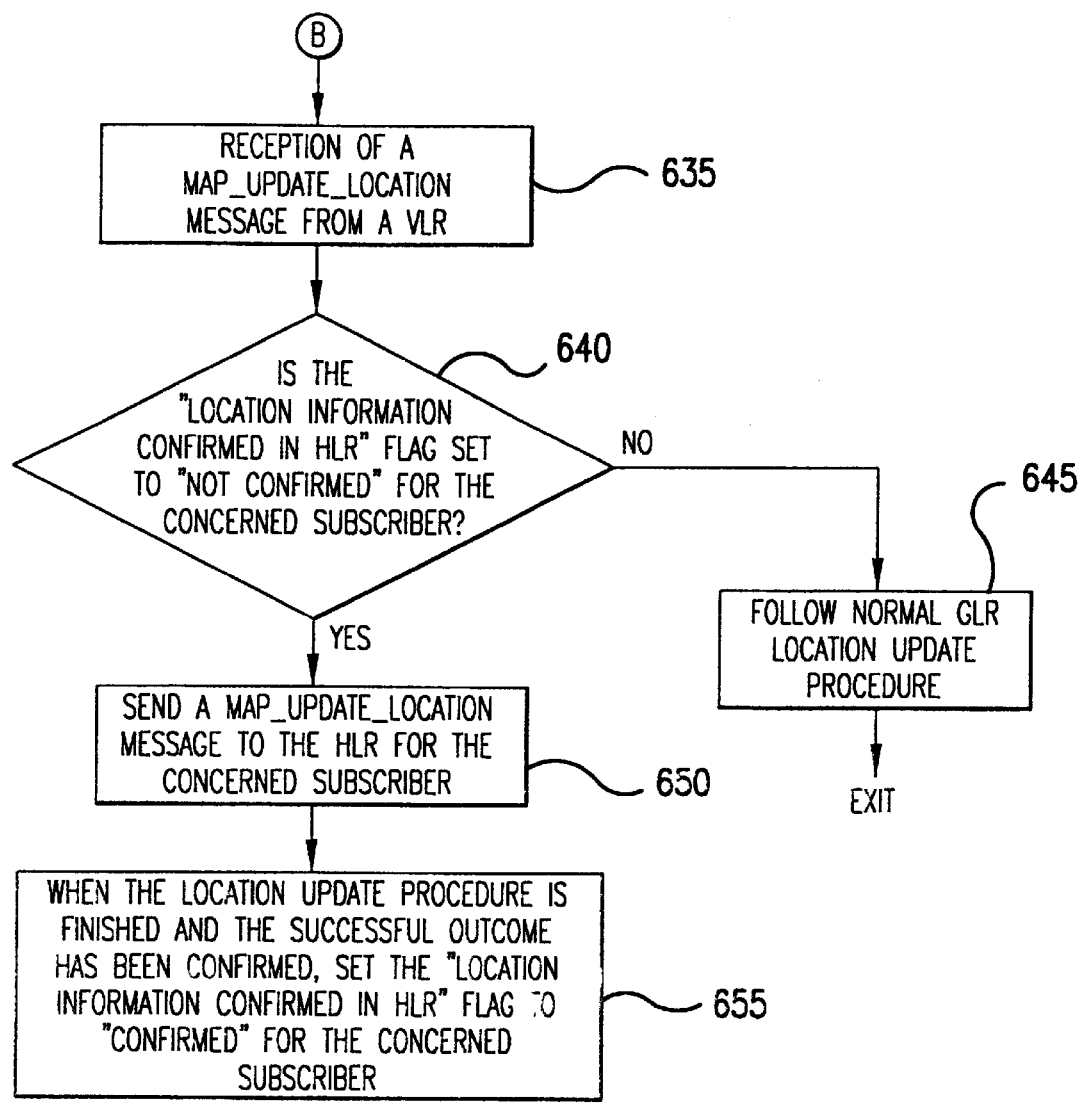

FIGS. 7A and 7B illustrate an exemplary method for the behavior of a GLR in a UMTS system where an HLR is recovering from a fault in accordance with yet another embodiment of the present invention. The method illustrated in FIGS. 7A and 7B is similar to the method described above in connection with FIGS. 6A and 6B. Accordingly, it will be understood that the steps in FIGS. 7A and 7B which have the same numbers as the steps described above with respect to FIGS. 6A and 6B perform the same functions as those described above with regard to FIGS. 6A and 6B. The difference between the method described above in connection with FIGS. 6A and 6B and the method described in FIGS. 7A and 7B, is in step 730. In step 730 the GLR sends a MAP_RESET message, without replacing the HLR number, to each VLR where at least one of the mobile subscribers associated with the HLR which sent the MAP_RESET message is located. In contrast, in step 630, the GLR replaces the HLR number with the GLR number in the MAP_RESET message sent to the VLRs. As can be seen by comparing FIGS. 6A and 6B with FIGS. 7A and 7B, whether the HLR number or the GLR number is placed in the MAP_RESET messages sent to the VLRs does not further effect the behavior of the GLR. However, as will be described in more detail below, the behavior of the VLR will depend upon whether the GLR number or the HLR number is present in the MAP_RESET message.

In the case of a MAP_RESET indication, indicating a restart in an HLR in a foreign network, in a system where a GLR serves a VLR, the VLR must be able to address the fact that there is both a (foreign) HLR and a GLR in the system. In other words, the VLR must be able to identify all the mobile subscribers belonging to the restarted HLR, but when the MAP_UPDATE_LOCATION procedures are executed, they should be directed towards the GLR, just as any MAP_UPDATE_LOCATION procedure.

Figure 9:
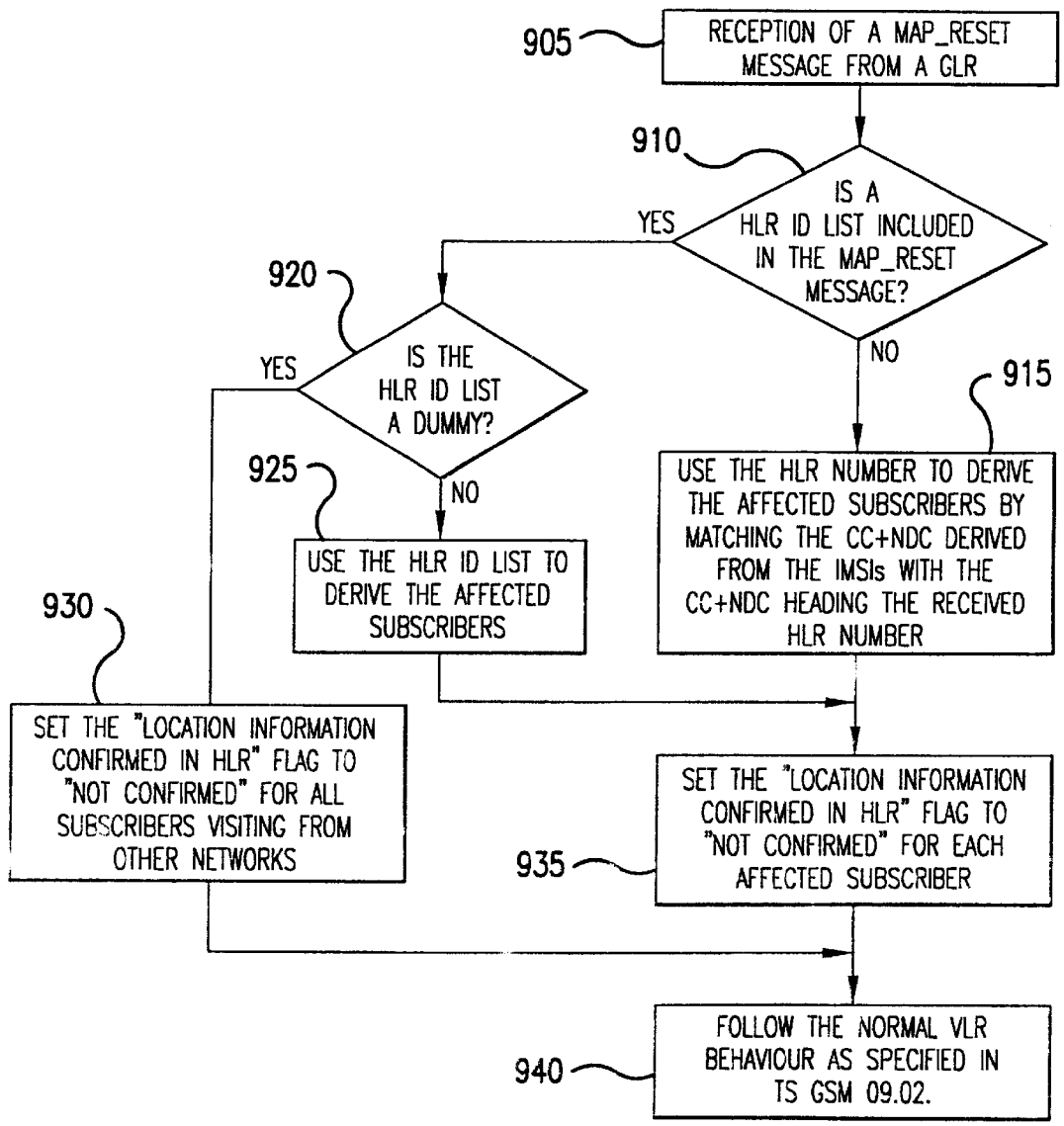
FIG. 9 illustrates an exemplary method for the behavior of a VLR in a UMTS system where an HLR is recovering from a fault in accordance with another embodiment of the present invention.
Figure 10:
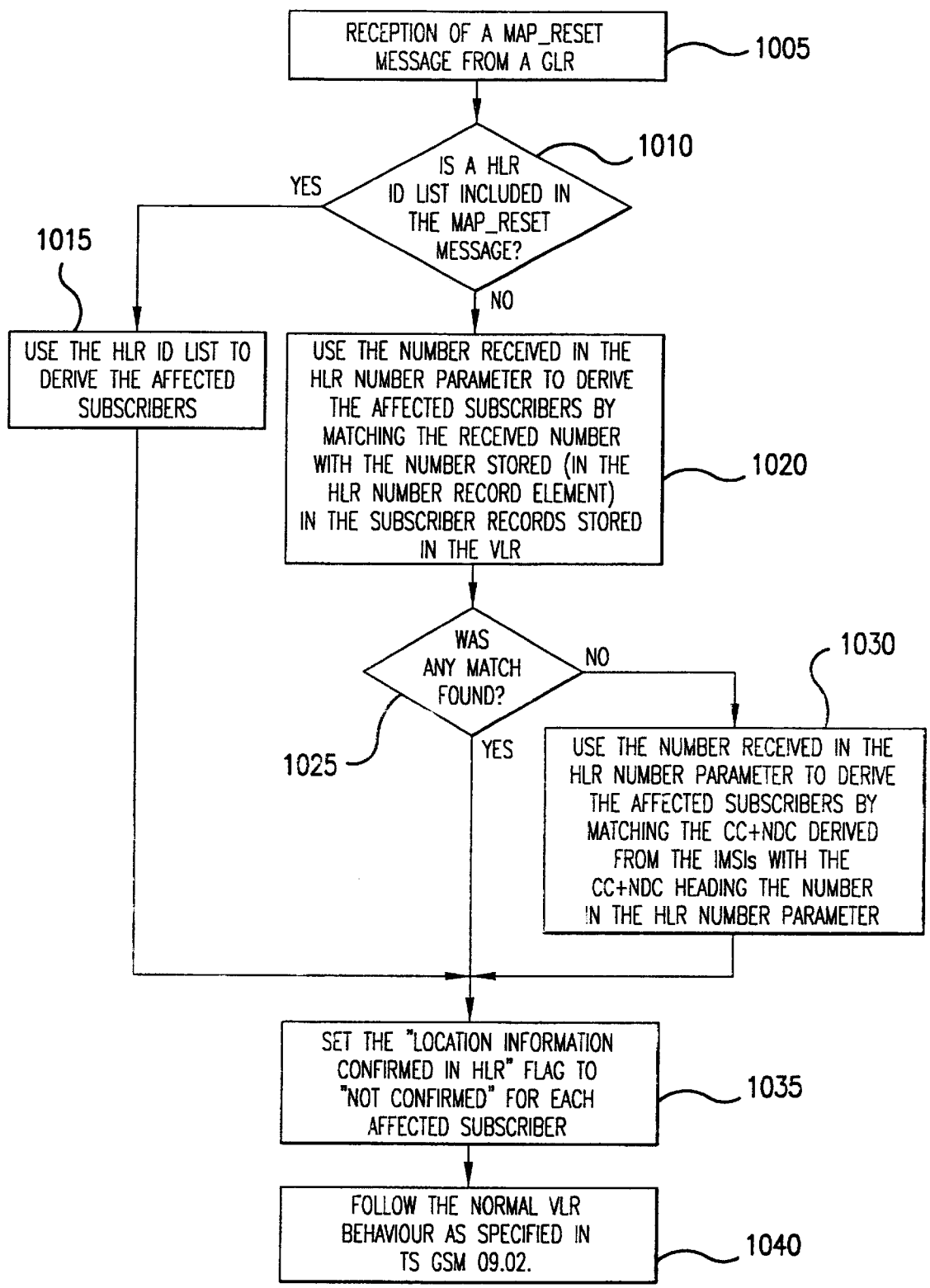
FIG. 10 illustrates an exemplary method for the behavior of a VLR in a UMTS system where an HLR is recovering from a fault in accordance with yet another embodiment of the present invention.

Since, in a UMTS system where a GLR serves VLRs the MAP_RESET message from the HLR will be delivered to the VLRs via the GLR, the VLR should preferably determine whether the MAP_RESET message is originating from the HLR or the GLR, i.e., whether the HLR or the GLR is recovering from a fault. In addition, the VLR, in a UMTS system, should be able to handle MAP_RESET messages sent directly from an HLR in a foreign PLMN, i.e., if the PLMN with which the VLR is associated does not have a GLR. Further, the VLR should be able to handle MAP_RESET messages sent from an HLR in the VLR's own PLMN. Accordingly, FIGS. 8–10 illustrate exemplary behavior of a VLR in the UMTS system for handling MAP_RESET messages in which the VLR can, among other things, address the different situations discussed above.

Figure 8:
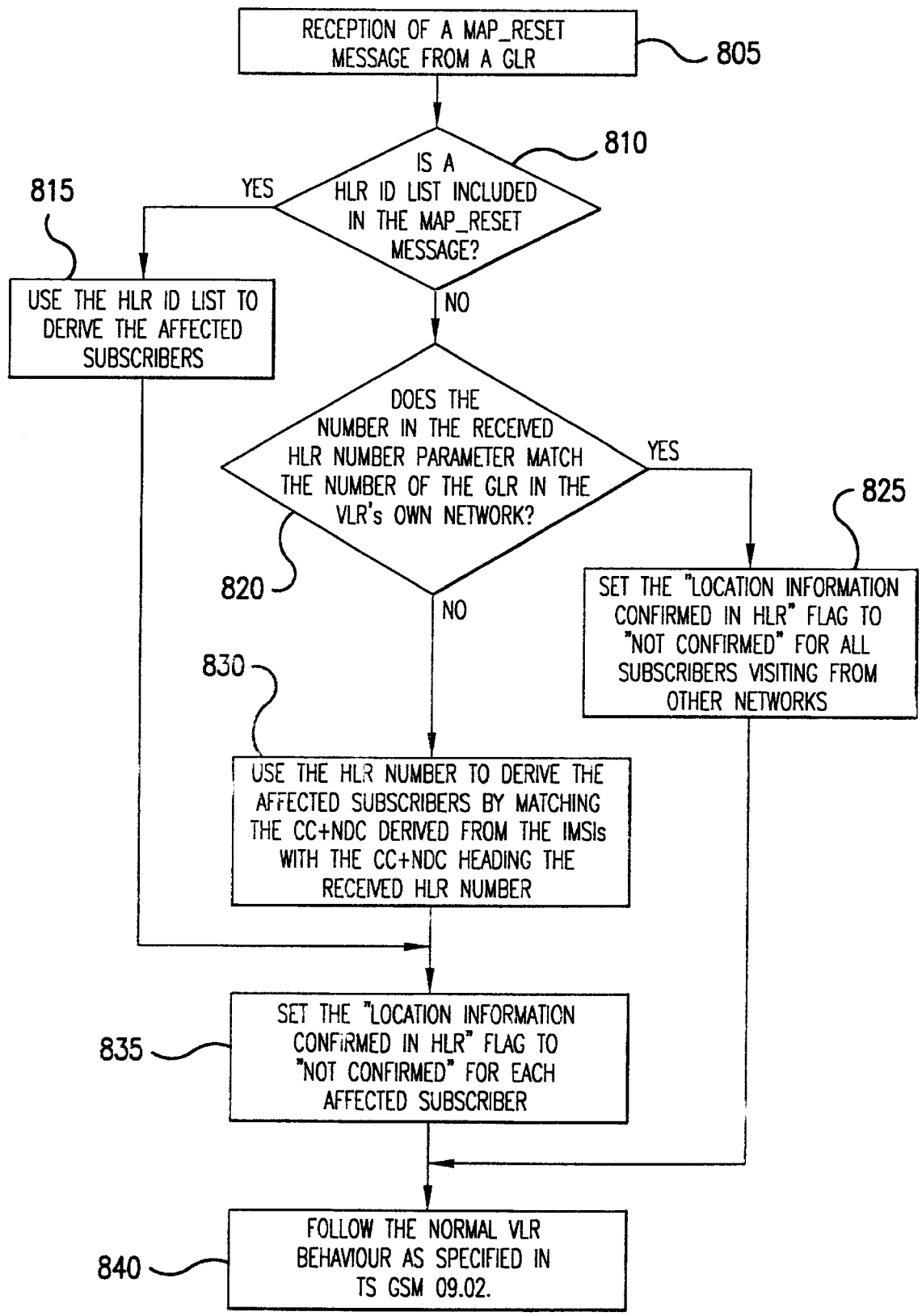
FIG. 8 illustrates an exemplary method for the behavior of a VLR in a UMTS system where an HLR is recovering from a fault in accordance with one embodiment of the present invention.

FIG. 8 illustrates an exemplary method for the behavior of a VLR in a UMTS system where an HLR is recovering from a fault in accordance with one embodiment of the present invention. In step 805 the VLR receives a MAP_RESET message from a GLR. In step 810 the VLR determines whether an HLR Id list is included in the MAP_RESET message. If the HLR Id list is present in the MAP_RESET message, in accordance with the "Yes" path out of decision step 810, the VLR uses the HLR Id list to derive the affected mobile subscribers in accordance with step 815. The VLR then sets the "Location Information Confirmed In HLR" flag to "Not Confirmed" for each affected mobile subscriber in accordance with step 835. In step 840 the VLR follows normal VLR behavior as specified in Technical Standard GSM 09.02 which is herein expressly incorporated by reference. Generally, the VLR behavior specified by Technical Standard GSM 09.02 is for the VLR to wait for an authenticated radio contact with the affected mobile subscriber and then initiate a location updating procedure with the HLR, via the GLR in the case of a UMTS system including a GLR in the mobile subscriber's current VPLMN.

If the HLR Id list is not present in the MAP_RESET message, in accordance with the "No" path out of decision step 810, the VLR determines whether the number in the received HLR Number parameter matches the number of the GLR in the VLR's own network in accordance with step 820. The number received in the HLR number parameter of a MAP_RESET message will match the GLR number when the GLR is recovering from a fault. According to exemplary embodiments of the present invention the VLRs which are served by a GLR can have the GLR's number programmed as configuration data in the VLR. When the GLR has sent the MAP_RESET message, because the GLR is recovering from a fault, all of the mobile subscribers served by the VLR, which is served by the GLR, will be affected. Accordingly, if the number in the received HLR Number parameter matches the number of the GLR in the VLR's own network, in accordance with the "Yes" path out of decision step 820, the VLR sets the "Location Confirmed In HLR" flag to "Not Confirmed" for all mobile subscribers visiting from other networks in accordance with step 825. In step 840 the VLR follows normal VLR behavior as specified in Technical Standard GSM 09.02.

If the number in the received HLR Number parameter does not match the number of the GLR in the VLR's own network, in accordance with the "No" path out of decision step 820, the VLR uses the HLR number to derive the affected mobile subscribers by matching the CC+NDC derived from the IMSIs stored in the VLR's mobile subscriber records with the CC+NDC of the received HLR number in accordance with step 830.

In a PLMN where a VLR is supported by a GLR, messages which would be addressed to the HLR associated with the mobile subscriber in a network without a GLR, are addressed to the GLR. The GLR then forwards the messages to the particular HLR when necessary, e.g., MAP_UPDATE_LOCATION messages would not be forwarded to the HLR if the concern mobile subscriber was already registered in the GLR. Accordingly, in a system where a VLR is served by a GLR the GLR's address is stored in the VLR's mobile subscriber records instead of the address of the HLR associated with the particular mobile subscriber. Hence, the VLR will not be able to derive the mobile subscribers associated with a particular HLR using a stored HLR number. Instead, the VLR derives the mobile subscriber associated with the VLR using the CC+NDC of the mobile subscriber's IMSI with the CC+NDC of the HLR number in the received MAP_RESET message.

In step 835 the VLR sets the "Location Confirmed In HLR" flag to "Not Confirmed" for each affected mobile subscriber. In step 840 the VLR follows normal VLR behavior as specified in Technical Standard GSM 09.02.

FIG. 9 illustrates an exemplary method for the behavior of a VLR in a UMTS system where an HLR is recovering from a fault in accordance with another embodiment of the present invention. In accordance with this embodiment of the present invention, the GLR could include a dummy HLR Id list parameter which would be easily recognizable by the VLR to indicate that the MAP_RESET message is originating from the GLR, i.e., to indicate that the GLR is recovering from a fault. For example, the dummy HLR Id list parameter could contain only zeroes, or some other dummy pattern which, like zeroes, could be programed by the manufacturer of the VLRs, i.e., not requiring network specific configuration.

Accordingly, in step 905 the VLR receives a MAP_RESET message from a GLR. In step 910 the VLR determines whether the HLR Id list is included in the MAP_RESET message. If the HLR Id list is not included in the MAP_RESET message, in accordance with the "No" path out of decision step 910, the VLR uses the HLR number to derive the affected mobile subscribers by matching the CC+NDC derived from the IMSIs stored in the VLR's mobile subscriber records with the CC+NDC of the received HLR number in accordance with step 915. The VLR sets the "Location Confirmed In HLR" flag to "Not Confirmed" for each affected mobile subscriber in accordance with step 935. In step 940 the VLR follows normal VLR behavior as specified in Technical Standard GSM 09.02.

If the VLR determines that the HLR Id list is included in the MAP_RESET message, in accordance with the "Yes" path out of decision step 910, the VLR determines whether the HLR Id list is a dummy HLR Id list in accordance with step 920. Since the dummy HLR Id list indicates that the MAP_RESET message is originating from a GLR which is recovering from a fault, all of the mobile subscribers served by the VLR will be affected subscribers. Accordingly, if the VLR determines that the HLR Id list is a dummy HLR Id list, in accordance with the "Yes" path out of decision step 920, the VLR sets the "Location Confirmed In HLR" flag to "Not Confirmed" for all mobile subscribers visiting from other networks in accordance with step 930. In step 940 the VLR follows normal VLR behavior as specified in Technical Standard GSM 09.02.

If the VLR determines that the HLR Id list is not a dummy HLR Id list, in accordance with the "No" path out of decision step 920, the VLR uses the HLR Id list to derive the affected mobile subscribers in accordance with step 925. In step 935 the VLR sets the "Location Confirmed In HLR" flag to "Not Confirmed" for each affected mobile subscriber. In step 940 the VLR follows normal VLR behavior as specified in Technical Standard GSM 09.02.

FIG. 10 illustrates an exemplary method for the behavior of a VLR in a UMTS system where an HLR is recovering from a fault in accordance with yet another embodiment of the present invention. In step 1005 the VLR receives a MAP_RESET message from a GLR. In step 1010 the VLR determines whether an HLR Id list is included in the MAP_RESET message. If the HLR Id list is present in the MAP_RESET message, in accordance with the "Yes" path out of decision step 1010, then the VLR uses the HLR Id list to derive the affected mobile subscribers in accordance with step 1015. In step 1035 the VLR sets the "Location Confirmed In HLR" flag to "Not Confirmed" for each affected mobile subscriber. In step 1040 the VLR follows normal VLR behavior as specified in Technical Standard GSM 09.02.

If the HLR Id list is not present in the MAP_RESET message, in accordance with the "No" path out of decision step 1010, the VLR uses the number received in the HLR Number parameter to derive the affected mobile subscribers by matching the received number with the number stored in the HLR Number record element in the mobile subscriber records stored in the VLR in accordance with step 1020. In step 1025 the VLR determines whether there was a match found between the HLR Number parameter in the MAP_RESET message and the HLR Number record stored in the mobile subscriber records in the VLR. If the VLR determines that there is a match between the HLR Number parameter in the MAP_RESET message and the HLR Number record stored in at least one of the mobile subscriber records in the VLR, in accordance with the "Yes" path out of decision step 1025, the VLR sets the "Location Confirmed In HLR" flag to "Not Confirmed" for each affected mobile subscriber in accordance with step 1035. In step 1040 the VLR follows normal VLR behavior as specified in Technical Standard GSM 09.02.

If the VLR determines that there is not a match between the HLR Number parameter in the MAP_RESET message and the HLR Number record stored in any one of the mobile subscriber records in the VLR, in accordance with the "No" path out of decision step 1025, the VLR uses the number received in the HLR Number parameter to derive the affected mobile subscribers by matching the CC+NDC derived from the IMSIs with the CC+NDC of the received HLR Number parameter in accordance with step 1030. In step 1035 the VLR sets the "Location Confirmed In HLR" flag to "Not Confirmed" for each affected mobile subscriber. In step 1040 the VLR follows normal VLR behavior as specified in Technical Standard GSM 09.02.

The exemplary embodiments of the present invention described above allow a system including a GLR and VLRs to handle HLR fault recovery situations without violating the GSM MAP specification. The message formats are unchanged and no message sequence is violated.

The present invention has been described by way of exemplary embodiments to which the invention is not limited. Other embodiments are of course possible. For example, in one embodiment the VLR behavior could be to exactly follow the VLR behavior specified in Technical Standard GSM 09.02. Further, one skilled in the art will recognize that the methods disclosed herein are also applicable in a UMTS system including generic packet radio service (GPRS) nodes for serving GPRS mobile subscribers. Other modifications and changes will occur to those skilled in the art without departing from the spirit and scope of the invention as defined in the appended claims.

What is claimed is:

1. A method of home location register (HLR) fault recovery in a wireless telecommunication system having a home network and a visited network, said home network including said HLR, and said visited network including at least one visitor location register (VLR) and a gateway location register (GLR) through which the VLRs and the HLR communicate, said method comprising the steps of:

receiving by the GLR, a first reset message from the HLR, wherein the first reset message contains a home location register number for the HLR;

determining by the GLR, which mobile subscribers in the visited network are associated with the HLR;

sending a second reset message from the GLR to the VLRs where mobile subscribers associated with the HLR are located;

receiving by the GLR, updated location messages from the VLRs for the mobile subscribers associated with the HLR; and forwarding from the GLR to the HLR, the updated location messages for the mobile subscribers associated with the HLR.

2. The method of claim 1, wherein the first and second reset messages are MAP_RESET messages.

3. The method of claim 1, wherein the first and second reset messages include a home location register identity list.

4. The method of claim 3, wherein the second reset message includes a gateway location register number, and the method further comprises the step of identifying by each VLR, the mobile subscribers associated with the HLR, using either the gateway location register number or the home location register identity list.

5. The method of claim 1, wherein the step of determining by the GLR, which mobile subscribers are associated with the HLR includes comparing a country code and national destination code of a mobile subscriber identity stored in a record associated with each mobile subscriber, with a country code and national destination code of the home location register number.

6. The method of claim 1, further comprising the steps of:

receiving the second reset message by one of the VLRs; and determining by the receiving VLR, whether there is a home location register identity list in the second reset message.

7. The method of claim 5, wherein the mobile subscriber identity is an international mobile subscriber identity.

8. The method of claim 1, wherein the updated location message is a MAP_UPDATE_LOCATION message.

9. The method of claim 1, wherein the step of determining by the GLR, which mobile subscribers are associated with the HLR includes comparing the home location register number received in the first reset message with a home location register number stored in a mobile subscriber record in the GLR.

10. The method of claim 3, further comprising, after the step of sending the second reset message from the GLR to the VLR, the steps of:

identifying by the VLR, mobile subscribers associated with the HLR using the home location register identity list; and setting in the VLR, a "location information confirmed in the HLR" flag to a "not confirmed" state for each mobile subscriber associated with the HLR.

11. The method of claim 3, further comprising, after the step of sending the second reset message from the GLR to the VLR, the steps of:

determining by the VLR, whether the home location register identity list contains a predetermined pattern;

setting in the VLR, a "location information confirmed in HLR" flag to a "not confirmed" state for all mobile subscribers visiting from other networks if the home location register identity list contains the predetermined pattern; and if the home location register identity list does not contain the predetermined pattern, performing the steps of:

deriving by the VLR, which mobile subscribers are associated with the HLR using the home location register identity list; and setting in the VLR, the "location information confirmed in the HLR" flag to the "not confirmed" state for each mobile subscriber associated with the HLR.

12. The method of claim 1, wherein the second reset message includes a home location register number parameter, and the method further comprises, after the step of sending the second reset message from the GLR to the VLR, the steps of:

determining by the VLR, whether a number received in the home location register number parameter of the second reset message matches a number of the GLR; and setting by the VLR, a "location information confirmed in the HLR" flag to a "not confirmed" state for all mobile subscribers visiting from other networks if the number received in the home location register number parameter matches the number of the GLR.

13. The method of claim 12, wherein if the number received in the home location register number parameter does not match the number of the GLR, performing in the VLR, the steps of:

deriving which mobile subscribers are associated with the HLR by matching a country code and national destination code derived from mobile subscriber identities stored in the VLR, with a country code and national destination code of the received home location register number parameter; and setting the "location information confirmed in the HLR" flag to the "not confirmed" state for each mobile subscriber associated with the HLR.

14. The method of claim 1, further comprising, after the step of sending the second reset message from the GLR to the VLR, the steps of:

deriving by the VLR, which mobile subscribers are associated with the HLR by matching a country code and national destination code derived from mobile subscriber identities stored in the VLR, with a country code and national destination code of the received home location register number parameter; and setting by the VLR, the "location information confirmed in the HLR" flag to a "not confirmed" state for each mobile subscriber associated with the HLR.

15. The method of claim 1, wherein the second reset message includes a home location register number parameter, and the method further comprises, after the step of sending the second reset message from the GLR to the VLR, the steps of:

deriving by the VLR, the mobile subscribers associated with the HLR by matching the received home location register number parameter with a home location register number stored in the VLR for each mobile subscriber;

determining whether a match was found;

deriving which mobile subscribers are associated with the HLR by matching a country code and national destination code derived from mobile subscriber identities stored in the VLR, with a country code and national destination code of the received home location register number parameter if a match was not found; and setting a "location information confirmed in the HLR" flag to a "not confirmed" state for each mobile subscriber associated with the HLR.

16. In a wireless communication system having a home network and a visited network, a fault recovery system for performing fault recovery for a home location register (HLR) located in the home network, said fault recovery system comprising:

messaging means within the HLR for sending, during fault recovery, a first reset message to a gateway location register (GLR) located in the visited network, wherein the reset message contains a home location register number for the HLR;

means for determining by the GLR, which mobile subscribers in the visited network are associated with the HLR;

messaging means within the GLR for sending a second reset message from the GLR to at least one visitor location register (VLR) where mobile subscribers associated with the HLR are located, and for receiving location update messages from each of the VLRs for mobile subscribers associated with the HLR;

means within each VLR for updating the locations of the mobile subscribers associated with the HLR in response to receiving the second reset message from the GLR; and messaging means within each VLR for sending the location update messages from the VLR to the GLR for the mobile subscribers associated with the HLR.

17. The fault recovery system of claim 16, wherein the first and second reset messages are MAP_RESET messages.

18. The fault recovery system of claim 16, wherein the first and second reset messages include a home location register identity list.

19. The fault recovery system of claim 18, wherein the VLR identifies mobile subscribers associated with the HLR using either a gateway location register number or the home location register identity list received in the second reset message from the GLR.

20. The fault recovery system of claim 16, further comprising means within each VLR for determining a mobile subscriber associated with the HLR by comparing a country code and national destination code of a mobile subscriber identity stored in a record associated with the mobile subscriber, with a country code and national destination code of the home location register number.

21. In a wireless communication system having a home network and a visited network, a gateway location register (GLR) located in the visited network, said GLR performing fault recovery functions for a home location register (HLR) located in the home network, said GLR comprising:

messaging means for communicating with the HLR and with at least one visitor location register (VLR) located in the visited network, said messaging means:
receiving, during HLR fault recovery, a first reset message from the HLR, wherein the reset message contains a home location register number for the HLR;
sending a second reset message from the GLR to each VLR which is currently serving at least one mobile subscriber associated with the HLR, said second reset message including information enabling each VLR to derive the identities of mobile subscribers associated with the HLR that are currently being served by the VLR;
receiving location update messages from each of the VLRs for mobile subscribers associated with the HLR; and
forwarding to the HLR, the location update messages received from the VLRs; and means for determining by the GLR, in response to receiving the first reset message from the HLR, which mobile subscribers in the visited network are associated with the HLR, and which VLRs are currently serving the associated subscribers.

22. In a wireless communication system having a home network and a visited network, a visitor location register (VLR) located in the visited network, said VLR performing fault recovery functions for a home location register (HLR) located in the home network, said VLR comprising:

messaging means for communicating with an intervening gateway location register (GLR) located in the visited network, wherein the HLR and the VLR communicate through the GLR, said messaging means:
receiving, during HLR fault recovery, a reset message from the GLR; and
sending to the GLR, location update messages for mobile subscribers associated with the HLR that are currently being served by the VLR;

means for deriving, from information contained in the reset message, the identities of the mobile subscribers associated with the HLR that are currently being served by the VLR; and means for updating the location information for the mobile subscribers associated with the HLR that are currently being served by the VLR, and providing the updated information to the messaging means.

23. The VLR of claim 22, further comprising means for determining whether the reset message received from the GLR is a reset message for the GLR or for the HLR.

24. The VLR of claim 23, wherein, responsive to determining that the reset message received from the GLR is a reset message for the GLR, the means for updating the location information updates the location information for all subscribers visiting from other networks.

25. The VLR of claim 24, wherein, responsive to determining that the reset message received from the GLR is a reset message for the HLR, the means for deriving identities derives the identities of the mobile subscribers associated with the HLR, and the means for updating the location information updates the location information only for the mobile subscribers associated with the HLR.

* * * * *